S. BENKÖ.
GALVANIC BATTERY.
APPLICATION FILED JAN. 19, 1909.
963,852. Patented July 12, 1910.
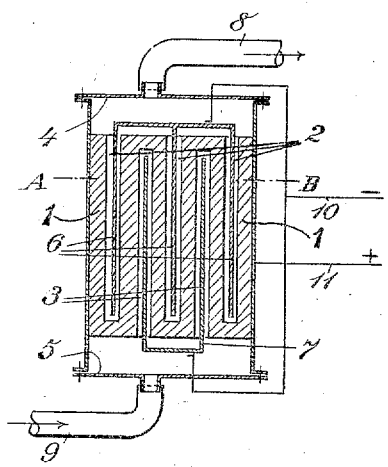
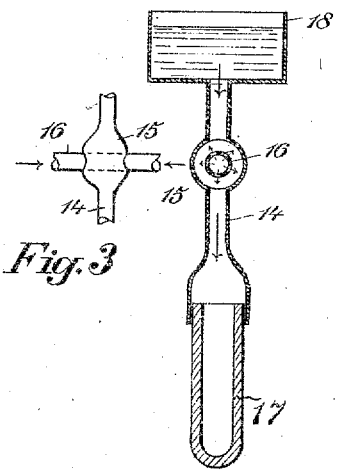
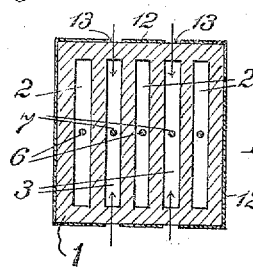
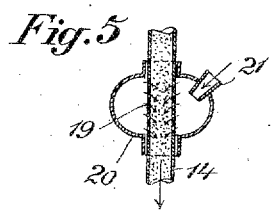
Witnesses:
M. H. Darg
L. A. Price
Inventor:
Stephan Benkö,
By Wm. E. Boulter,
Attorney

UNITED STATES PATENT OFFICE.

STEPHAN BENKÖ, OF BUDAPEST, AUSTRIA-HUNGARY, ASSIGNOR TO COMPANY LIMITED FOR EXPLOITATION OF INVENTIONS BY STEPHAN BENKO, OF BUDAPEST, AUSTRIA-HUNGARY.

GALVANIC BATTERY.

963,852.    Specification of Letters Patent.    Patented July 12, 1910.

Application filed January 19, 1909. Serial No. 473,047.

*To all whom it may concern:*

Be it known that I, STEPHAN BENKÖ, a subject of the King of Hungary, residing at Budapest, Austria-Hungary, have invented certain new and useful Improvements in or Relating to Galvanic Batteries, of which the following is a specification.

This invention relates to the working or operation of galvanic elements by means of gas depolarization and by drawing or pressing the electrolyte through the depolarization (carbon) electrode.

The process consists in producing on one side of the porous negative electrode (carbon electrode) of the element, a depression or lessening of pressure so that the excess of pressure thus produced on the other side of the electrode, forces the electrolytic liquid from that side, through the pores of the negative electrode (positive pole electrode); or, for obtaining the same result, an excess of pressure is produced on one side of the electrode, while on the other side there is the ordinary atmospheric pressure, or even a partial vacuum. Finally, excess of pressure and depression or partial vacuum can be alternately produced on one side, so that the electrolytic liquid will be caused to fluctuate actively. When the liquid is forced through the pores of the carbon, by producing a vacuum on one side, the element can be completely closed, but when excess of pressure is used, the element must be open or provision must be made for a sufficient discharge of the liquid pressed through.

The invention relates also to the manufacture of closed single cells, as well as to the manufacture of metal contacts secured to the electrodes, for transmitting the current.

An essential feature of the invention is constituted by the use, for forcing through the carbon, of an electrolyte consisting of a liquid rich in oxygen or chlorin, or mixed or saturated with a depolarizing gas, for instance, oxygen (air) or chlorin. The forcing through of this electrolytic liquid brings about an exceedingly energetic depolarization of the electrode. The electrolytic liquid is in a continuous movement, the pores of the carbon are, therefore, being constantly washed so that no polarizing deposit can be formed. This action is increased by the fact that the element or cell does not possess any diaphragm or the like, so that no resistance is offered to the flow of electrolytic fluid.

The zinc electrode is mounted free in the electrolyte inclosed in the recess or hollow of the carbon, so that it is also energetically washed by the flowing electrolyte. In elements operating with suction, the zinc electrode is exposed to a vacuum. The continuous renewal of the electrolyte which if desired can be used repeatedly and, therefore, caused to circulate, insures that the current from the cell or element shall remain constant, while being moreover much stronger than the current of well known cells of similar dimensions. The washing of the pores obtained by this process, also reduces the inner resistance of the element.

Although the forcing through of the electrolyte by the increase of pressure on one side of the carbon electrode is advantageous, the use of a vacuum has still greater advantages. Thus the depolarizing gas passes into the element in the manner hereinafter described, without any special auxiliary force, and in a very finely divided state and can be simply drawn in at any porous point of the electrolyte supply pipe. The use of a vacuum also brings about a continuous boiling of the electrolytic liquid while owing to the continuous flow, the temperature of the heat developing elements (chromic acid elements) is reduced, (but this result is obtained also when pressure is used.)

Figures 1 and 2 of the accompanying drawing show a construction of an element suitable for carrying out the process according to this invention. Fig. 1 is a vertical sectional elevation, and Fig. 2 a horizontal section on line A—B of Fig. 1. Figs. 3, 4 and 5 show arrangements for introducing the depolarizing gas into the electrolyte. Fig. 3 is an outside elevation of part of the device, Fig. 4 is a vertical sectional elevation at right angles to Fig. 3 and shows the complete device, and Fig. 5 is a vertical cross-section of a modified form of device, only a part being shown.

The element—which in itself is not claimed in the present application—consists of a carbon body 1, with two systems of recesses 2 3 opening at opposite sides. These sides of the element are closed by means of caps 4 5, and into the recesses 2 dip zinc electrodes 6, while into the recesses 3 are introduced zinc electrodes 7. To the upper cap is connected a vacuum pipe 8, while to the bottom cap is connected the supply or pressure pipe 9; this arrangement producing two systems separated from each other by carbon partitions. From the zinc electrodes 7, the current conductor 10 branches off, while the other conductor 11 branches off from the carbon electrode 1. The outer lateral walls of the carbon body 1 are rendered air and liquid tight by means of a coating 12, in such manner that only the longitudinal strips 13 adjoining the bottom recesses 3 are left exposed, so that atmospheric air or compressed air can enter the recesses 3 only at these points. The electrolytic liquid is supplied through the pipe 9 at atmospheric or a higher pressure. When a vacuum is produced by means of the pipe 8 connected to the vacuum apparatus, the electrolyte as well as the air are drawn by suction from the bottom system into the upper one, in such manner that the said electrolyte and air saturate the carbon partitions separating the two systems, the deposits settling in the pores of the walls being at the same time washed away. The air in this construction will pass through the exposed surface strips 13 in a finely divided state into the electrolyte introduced through the pipe 9 into the bottom system, without any further auxiliary means, and on the atmospheric pressure gradually sinking it will pass together with the said electrolyte through the carbon partitions into the upper system whence the said air will pass through the pipe 8 into the vacuum tank arranged outside the element or cell. When it is desired in this element to introduce electrolyte under pressure, the depolarization substance (oxidizing gas or chlorin) must be incorporated with the electrolyte previously in any desired manner, for instance, by pressing it into the liquid. The electrolyte mixed with the depolarization substance, is forced in through the pipe 9 and leaves the element either through a very wide pipe 8 arranged at its upper portion, so that any polarizing gases produced can easily escape, or the element can be quite open at the top, the liquid leaving the element through an overflow pipe. This latter construction is more advantageous, as the gases can easily escape from a completely open element. Even when pressure is used, the pipe 8 can be kept narrow, only in order to facilitate the escape of the gases, it is then also necessary to produce a vacuum in it. When pressure is used, the slots 13 are of course done away with. The element shown in Figs. 1 and 2, is more suitable for the use of a vacuum than for that of a pressure. When using pressure, provision must be made for discharging the gases for the following reasons:—When the element is closed and no provision is made for sufficiently quick discharge of the electrolyte, an action opposite to that desired will take place. There will be mainly produced an increase of pressure which will result in an immediate polarization, as the polarizing gases (hydrogen) will penetrate into the carbon.

As already stated, in the construction illustrated in Figs. 1 and 2, when operating with a vacuum, air having a depolarizing action is drawn in through the openings 13 of the porous carbon body without any further auxiliary means. If it is desired to add chlorin to the electrolyte, the element can be arranged in an atmosphere of chlorin (for instance in a tank filled with chlorin). For carrying out the process forming the object of this invention, it is not, however, necessary when using a vacuum, that the polarizing substance (gas) should be introduced at the carbon body itself (at the exposed portions 13) this can be effected for instance by mixing the said depolarizing substance with the electrolyte beforehand, as already mentioned for introduction under pressure, or arrangements such as shown in Figs. 3, 4 and 5 could be used. Figs. 3 and 4 show a construction in which a porous body 16 is inserted into the electrolyte pipe 14, for instance at a widened portion 15 of the same. This body (which for instance can be made of carbon) may be solid, or as shown in Fig. 4 of the drawing, may be provided with a longitudinal perforation. The electrolyte is supplied from a tank 18 and flows to the pole 17 diagrammatically indicated. When a suction is produced at the pole, or in certain cases (when the tank 18 is arranged at a sufficiently high level) even without suction, the electrolyte exercises an injector-like action and carries with it the air in the direction of the arrows. The liquid in that construction will be impregnated with air. The same object can be attained with the construction shown in Fig. 5. In that case the electrolyte pipe 14 is itself provided with a porous portion 19 through which the depolarization substance is carried in the direction of the arrows from the atmosphere surrounding the pipe. When the electrolytic liquid is to be saturated, for instance with chlorin gas, a casing 20 closed in an air-tight manner is arranged about the porous portion of the pipe 14, and chlorin gas introduced into the said casing through a branch 21. This arrangement could also be used for the constructions shown in Figs. 3 and 4. Generally speaking the depolarizing substance (gas) can be absorbed by the electrolyte at any desired point of the electrolyte pipe or at any point of the pole itself, the only condition being that the point in question must be situated between the electrolyte tank and the recess of the negative (carbon) electrode, in which recess, as already stated, is placed the zinc electrode.

What I claim as my invention and desire to secure by Letters Patent is:—

1. A method of operating galvanic elements which comprises passing the electrolyte, containing a depolarizing gas, through the pores of the negative electrode, by creating alternately a higher and a lower pressure on one side of the electrode.

2. A method of operating galvanic elements which comprises passing the electrolyte, containing a depolarizing gas, through the pores of the negative electrode, by creating alternately an excess of pressure and a vacuum on one side of the electrode.

3. A method of operating galvanic elements which comprises passing the electrolyte through a porous tube surrounded by an atmosphere of depolarizing gas, so that said depolarizing gas is drawn into the electrolyte, and passing the electrolyte containing the depolarizing gas through the pores of the negative electrode.

In testimony whereof I have signed my name to this specification in the presence of two subscribing witnesses.

STEPHAN BENKÖ.

Witnesses:
JOSEPH WIEKMANN,
BÉNI GRÜNWALD.